INVENTOR:
CHRISTY W. BELL,
BY William Freedman
ATTORNEY

United States Patent Office 3,462,646
Patented Aug. 19, 1969

3,462,646
CIRCUIT BREAKER WITH HIGH SPEED CIRCUIT RESTORING MEANS
Christy W. Bell, Berwyn, Pa., assignor to General Electric Company, a corporation of New York
Filed June 23, 1967, Ser. No. 648,376
Int. Cl. H02h 5/00, 7/26, 3/28
U.S. Cl. 317—22        14 Claims

ABSTRACT OF THE DISCLOSURE

A circuit breaker connected in a power line is tripped open at high speed in response to the traveling wave accompanying a fault on the power line. A conventional protective relay decides whether the fault is one which requires continued opening of the breaker to isolate the fault. If the relay decides that continued opening is not required, a triggered gap device connected across the circuit breaker contacts is immediately triggered into conduction to restore or maintain current through the power line. In one embodiment, triggering is initiated before the relay makes its decision and is continued if the decision is that continued opening is not required.

Background of the invention

This invention relates to circuit protective means comprising a circuit breaker capable of opening at high speed in response to a fault on a power circuit and means for immediately restoring current through the power circuit if the fault is one that does not require continued opening of the circuit breaker for its isolation.

The usual electric power system comprises a number of system portions interconnected by circuit breakers between adjacent portions. These circuit breakers are usually controlled by protective relays capable of sensing the occurrence of a fault in any of the system portions and of initiating opening, or tripping, of those particular circuit breakers which are located to effect isolation of the faulted system portion from the remainder of the system. It is a general objective in the art of protective relaying to open only those circuit breakers at the terminals of the faulted system portion so that a maximum amount of the system remains available for continued uninterrupted service.

Although high speed protective relays are available, such relays still require a significant amount of time after fault initiation to sense the presence of the fault and to initiate circuit-breaker tripping. One factor that limits the extent to which this time can be reduced is that the usual relay must wait for a buildup of fault current before it can sense the presence of the fault.

Summary

An object of the invention is to sense the presence of a fault and to initiate circuit-breaker tripping before the usual protective relay can operate to initiate tripping in response to a buildup of fault current.

Another object is to obviate the need for determining where the fault is located prior to initiating circuit breaker tripping and, despite this, to permit substantially uninterrupted service to be maintained on unfaulted portions of the system.

Another object is to provide means capable of restoring current through a power circuit immediately after circuit-breaker opening without the usual delay required for a mechanical reclosing device to return the circuit breaker contacts to a position of reengagement.

In carrying out the invention in one form, I provide circuit protective means for a power circuit comprising a high speed circuit breaker having a pair of relatively movable contacts that are normally engaged and arranged for connection in said power circuit. For separating the contacts and establishing an inter-contact gap for interrupting current through the power circuit, I provide high speed opening means that operates in response to a traveling wave on the power circuit indicative of a fault thereon. Relay means is provided to decide whether the traveling wave represents a fault that requires continued opening of the circuit breaker to isolate the fault. If the relay means decides that continued opening is not required, current through the power circuit is immediately restored, or maintained, by means that establishes an arc that effectively shunts the inter-contact gap. This latter means comprises a trigger gap that is sparked-over to produce a shunting arc.

Brief description of drawings

For a better understanding of the invention, reference may be had to the following description taken in conjunction with the accompanying drawings, wherein.

Detailed description of preferred embodiments

Figure 1:
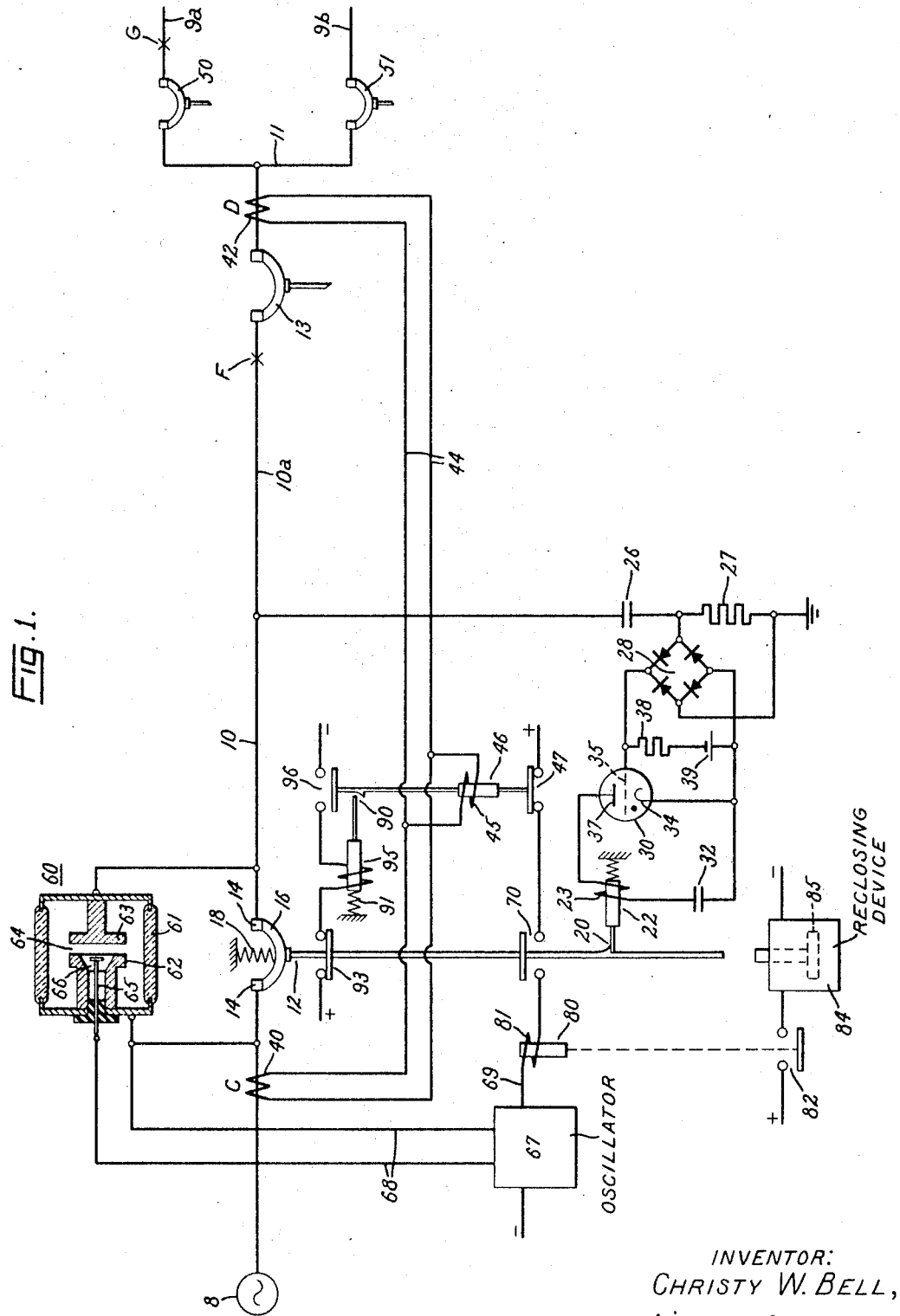
FIG. 1 is a schematic illustration of a power system including circuit protective means embodying one form of the invention.

Referring now to FIG. 1, there is schematically shown, in conventional one-line form, a high voltage power line or circuit 10 for supplying current from a source 8 to a plurality of load circuits 9a and 9b connected to a bus 11. Connected in the power circuit 10 near its respective opposite ends are two circuit breakers 12 and 13. Circuit breaker 12 is of a type that opens at extreme high speed when an opening signal is supplied to it, but to simplify the description and facilitate an understanding of the invention, I have shown it in a conventional schematic form. A more detailed example of a suitable high speed circuit breaker is shown and claimed in U.S. Patent 2,740,859, Beatty, assigned to the assignee of the present invention.

The schematically illustrated circuit breaker comprises stationary contacts 14, a movable bridging contact 16, and an opening spring 18 biasing bridging contact 16 downwardly toward a disengaged or open position with respect to stationary contacts 14. A suitable trip latch 20 normally holds the movable bridging contact 16 in its engaged position against the downward opening bias of spring 18. Trip latch 20 is controlled by a suitable tripping solenoid 22 which can be operated to release the trip latch 20 and permit opening spring 18 to separate contacts 14, 16. The tripping solenoid 22 comprises an operating coil 23 referred to hereinafter as a trip coil.

High speed tripping in response to a traveling wave

In accordance with the invention, we initiate a circuit-breaker tripping operation in response to a travelling wave on power circuit 10. This is accomplished by voltage-responsive tripping means comprising the series combination of a capacitor 26 and a resistor 27 connected between the high voltage power line 10 and ground. If there should be a fault on power line 10, a traveling wave, which may be of either positive or negative polarity depending upon the instant of fault initiation, travels from the point of the fault toward the circuit breaker at substantially the speed of light, immediately producing a sharp increase in voltage across the resistor-capacitor combination 26, 27. This produces a sudden increase in the voltage across resistor 27 since the voltage across the capacitor cannot immediately change. This increase may be in either the positive or negative direction depending upon the polarity of the traveling wave. This sharp increase in voltage across resistor 27 is used to trigger into conduction a normally-off breakdown device such as a thyratron 30. The series combination of thyratron 30 and trip coil 23 is connected across a charged capacitor 32. When thyratron 30 is turned on, capacitor 32 rapidly discharges through trip coil 23, thus operating the tripping solenoid 22 to trip open the circuit breaker 12.

The thyratron 30 comprises a cathode 34, a grid 35, and an anode 37. When grid 35 is made positive with respect to cathode 34 by a predetermined minimum voltage, the thyratron turns on and a conductive path is established between the anode and cathode. A suitable loading resistor 38 and biasing means 39 are connected in series across the grid-to-cathode circuit. The biasing means maintains a slight negative bias on the grid to prevent unintentional turn-on of the thyratron 30.

In the illustrated embodiment of the voltage-responsive tripping means, a full-wave rectifier 28 has its input terminals connected across the resistor 27 and its output terminals connected across the grid-cathode circuit of the thyratron 30. When the voltage across the resistor 27 increases sharply, either in a negative or positive direction, in response to a traveling wave on power line 10, the grid-to-cathode voltage rises sharply to a value which effects an immediate breakdown of the thyratron 30. The full-wave rectifier 28 assures that whether the traveling wave is of positive or negative polarity, the sharp change in voltage that it produces across resistor 27 makes the grid 35 increasingly positive with respect to the cathode 34, thus assuring turn-on of the thyratron 30 in response to the traveling wave. The loading resistor 38 assures that no substantial portion of the voltage appearing across resistor 27 prior to thyratron turn-on will appear across the diodes of rectifier 28. The above-described voltage-responsive tripping means (26, 27, 28, 30, 32) has been shown in a schematic, simplified form since its details form no part of the present invention.

The tripping capacitor 32 has a charging circuit which can be of a conventional form and therefore has not been shown in the drawing for the sake of simplicity.

The latch 20 of the circuit breaker 12 can also be tripped through operation of a conventional protective relaying system. This protective relaying system can include the differential relay 46, soon to be described, or other conventional relay means. The means for tripping in response to operation of such conventional relay is not shown.

In accordance with one form of the invention, I trip the circuit breaker as quickly as possible in response to arrival of the traveling wave at the circuit breaker without waiting for the usual protective relaying system to determine whether the traveling wave represents a fault requiring opening of the circuit breaker 12 for its isolation. This early start in an interrupting operation enables the circuit breaker to complete the interrupting operation sooner than would otherwise be possible. If the breaker 12 is a vacuum circuit breaker, and this is a preferred construction for the circuit breaker, it is usually capable of completing the interruption at the first current zero following parting of the contacts unless contact part occurs just prior to current zero. By starting the interrupting operation at an earlier instant, there is a greater likelihood that interruption will be completed at the first current zero following fault initiation.

Protective relaying means for determining fault location

While the contacts of the circuit breaker are parting, the usual protective relaying system decided whether the traveling wave represented a fault that called for opening of the circuit breaker for its isolation. This protective relaying system can be of any conventional form. In the illustrated embodiment, I have shown it as a differential relaying system comprising a pair of current transformer secondary windings 40 and 42. These secondary windings 40 and 42 are linked to suitable magnetic cores (not shown) which surround primary conductor 10 at the terminals C and D of a protected zone 10a of the primary circuit extending between the windings. Secondary windings 40 and 42 are connected in a conventional differential circuit 44 comprising the operating coil 45 of a differential relay 46 connected across the two windings. So long as the vector difference between the currents entering and leaving the protected zone 10a of the primary circuit 10 between windings 40 and 42 is below a predetermined value, the differential relay 45 remains inactive since the secondary current through its operating coil 45 is below its pickup value. But if this vector difference should exceed a predetermined value, the secondary current through operating coil 35 will increase to a sufficient value to cause differential relay 46 to operate.

From the above explanation of the differential relaying system, it will be apparent that if there is a fault on the primary circuit outside the protected zone 10a (for example, at G), the differential relay 46 will not operate since the primary current entering at terminal C continues to equal the primary current leaving through terminal D. But if there is a fault inside the protected zone (e.g., at F), the differential relay 46 will operate since the current entering through terminal C greatly exceeds that leaving through terminal D.

Preferably the differential relay 46 is of the conventional "percentage differential type" described on pp. 65–68 of the "Art and Science of Protective Relaying," by C. R. Mason, published in 1956 by John Wiley and Sons. For simplicity, however, I have not shown the usual restraining coil that is provided in such a relay in order to prevent improper operation under high "through" current conditions due to saturation-produced errors in the current transformers. The differential relay 46 is preferably a high speed or instantaneous relay that operates in a fraction of a half cycle when a fault occurs in the protected zone between C and D.

If a fault on the electric system is located in the protected zone 10a of power circuit 10, it is necessary to open circuit breaker 12 in order to isolate the fault from source 8. But if the fault is located outside the protected zone, then opening of circuit breaker 12 is not required to effect isolation. For example, if the fault is on one of the load circuits 9a as indicated at G, then only a circuit breaker in load circuit 9a, e.g., circuit breaker 50, requires opening to isolate the fault. Circuit breaker 12 can remain closed, supplying current to the other load circuit 9b through its closed circuit breaker 51, thus maintaining continuous service to loads on the other circuit 9b despite the presence of a fault at G on circuit 9a.

Circuit restoring means

For effecting an immediate reclosing of power circuit 10, we provide a triggered vacuum gap device 60 that is connected across contacts 14, 16 of circuit breaker 12. This gap device 60 can be of a suitable conventional type and is therefore shown in schematic form only. Examples of such a triggered vacuum gap device are shown in more detail and claimed in U.S. Patents 3,087,092, Lafferty, and 3,303,376, Lafferty, both assigned to the assignee of the present invention. Generally speaking, this gap device comprises a highly-evacuated envelope 61 and a pair of spaced-apart main electrodes 62 and 63 defining a main vacuum gap 64 therebetween. A trigger electrode 65 extends into the evacuated envelope, and a trigger gap 66 is located between trigger electrode 65 and main electrode 62. Though not shown, this trigger gap 66 is preferably disposed along the surface of a ceramic element. Typically, the ceramic element includes a V-notch on opposite sides of which the trigger electrodes, impregnated with hydrogen, are located, as in the aforesaid Lafferty patents. When a voltage or trigger pulse is applied across the trigger gap 66, it sparks over, injecting ionized gas into the main gap 64, thus producing an arc-over of the main gap. Though not shown, a separate trigger gap should preferably be located adjacent each main electrode 62, 63, as in the aforesaid Lafferty Patent 3,303,376.

When triggering is discontinued, the main gap 64 recovers its dielectric strength on the first natural current following discontinuance of triggering, thereby interrupting the current through the main gap. This ability to interrupt on the first current zero following discontinuance of triggering is a characteristic of a well-constructed triggered vacuum gap of the type shown in the aforesaid Lafferty patents.

For supplying trigger pulses to trigger gap 66, a pulse oscillator 67 of a suitable conventional form is connected across the trigger gap through a trigger circuit 68. This oscillator is normally off, but when it is turned on, it supplies voltage pulses to the trigger gap 66 at a preselected desired frequency. These pulses continue until the oscillator 67 is disabled or turned off. The turn-on circuit for oscillator 67 is shown at 69. When this circuit 69 is completed, it turns on oscillator 67, causing the oscillator to supply voltage pulses to trigger gap 66 until the turn-on circuit is interrupted.

Selective operation of circuit restoring means

Whether the fault occurs at F or G, however, I immediately operate circuit breaker 12 in response to arrival of the traveling wave at the circuit breaker, as has been described hereinabove. If protective relay 46 decides that the fault is one which does not require continued opening of breaker 12 to isolate the fault, then I effect an immediate reclosing of the power circuit. If protective relay 46 decides that the fault is one which does require continued opening of the circuit breaker 12 to isolate the fault, then I allow the circuit 10 to remain open, either on a permanent basis or at least for a relatively long time that provides a reasonable opportunity for deionization of the fault path. In certain applications the circuit breaker will then be reclosed after this relatively long time even though the fault was in the protected zone of the power circuit, on the assumption that the fault was a temporary one which had then cleared itself.

When the circuit breaker trips open in response to arrival of the traveling wave, it closes a set of control contacts 70 in the turn-on circuit 69 for oscillator 67. If the fault that produced the traveling wave is a fault inside the protected zone 10a between C and D, then high speed differential relay 46 would have opened before contacts 70 were closed and the turn-on circuit 69 would have remained open. Under such conditions, no trigger pulse would be supplied to the triggered vacuum gap 60 and no immediate reclosing of the power circuit would take place through the triggered vacuum gap.

Fault-responsive relay 46 should remain in its operated condition once it picks up, so long as circuit breaker 12 is open. This is the case because drop-out of relay 46 following interruption of power circuit 10 by breaker 12 would erroneously turn on the oscillator 67, thereby erroneously arcing over the triggered vacuum gap 60 and reinitiating fault current. To prevent such an erroneous dropout of fault responsive relay 67, I provide a latch 90 that holds fault responsive relay 46 picked-up following its operation. A reset spring 91 moves latch 90 into its latching position when fault-responsive relay 46 picks up, thus holding relay 46 in its picked-up position. When breaker 12 is subsequently reclosed, as will soon appear more clearly, a set of "a" contacts 93 thereon close, operating a reset solenoid 95 which permits the fault responsive relay 96 to drop out and reset. Auxiliary contacts 96 on the fault-responsive relay open upon relay-dropout to deenergize reset solenoid 95.

If the fault responsible for the traveling wave had been one located outside the protected zone, e.g., at G, the differential relay 46 would have remained inactive even though the circuit breaker tripped open. Under these conditions, when control contact 70 closed in response to circuit breaker opening, the turn-on circuit 69 for oscillator 67 is completed. This results in the triggered vacuum gap being immediately arced-over, thereby completing a shunt circuit through the arc in the triggered vacuum gap around the then-separated contacts 14, 16. Immediately following the first current zero after which the oscillator 67 has been turned on, the current through the power circuit 10 follows a path through triggered vacuum gap 60. Oscillator 67 continues to supply triggering pulses to the triggered vacuum gap, maintaining it in a conductive condition through successive half cycles of power current until contacts 14, 16 of the circuit breaker can be reengaged or reclosed.

During this interval, the circuit breaker 50 in the load circuit 9a opens and interrupts this load circuit thereby isolating the fault from the remainder of the system.

Modified operating sequence

In a modified embodiment of the invention, I always turn on the triggering oscillator 67 in response to circuit-breaker opening (by closing contacts 70 before relay 46 can open its contacts 47); and after this, a decision is made by relay 46 as to whether the fault is one requiring continued opening of the circuit breaker. If relay 46 decides that continued circuit breaker opening is required, it opens its contacts 47, turning off oscillator 67 to terminate triggering of gap device 60. This enables the gap device 60 to clear on the next succeeding current zero through the power circuit, thus interrupting the power circuit and clearing the fault. The gap device 60 is able to effect this prompt clearance because it is a vacuum gap, as explained hereinabove.

If relay 46 decides that continued opening of the circuit breaker is not required for fault isolation, it remains inactive to permit oscillator 67 to continue triggering gap device 60.

In this modified operating sequence, even though the gap device 60 is initially supplied with trigger pulses before the relay 46 makes its decision, continued triggering is dependent upon the decision of relay 46. This continued triggering is needed to cause continued conduction of the gap device after each current zero. Thus, even in this modified operating sequence, it can be said that, at a current zero, the triggering means 67, 68, 65, 66 triggers the gap device 60 into conduction if the relay 46 has determined that continued opening of the breaker is not required for fault isolation.

This modified operating sequence has the advantage of preventing even short interruptions in service if the fault is outside the zone of protection of relay 46, e.g., at G.

Reclosing of the circuit breaker

Returning now to the unmodified operating sequence, I reclose the contacts 14, 16 whenever the gap 60 is triggered for a predetermined minimum duration, indicative of a fault not requiring continued opening of the circuit breaker. For effecting reengagement of contacts 14, 16 of breaker 12 under such conditions, I provide a reclosing relay 80 having an operating coil 81 connected in the oscillator turn-on circuit 69. Turn-on of oscillator 67 also results in pick-up of this reclosing relay 80, assuming the turn-on circuit 69 remains energized for a predetermined minimum duration. Reclosing relay 80, in picking-up, closes its contacts 82 to complete a reclosure-initiating circuit for a conventional reclosing device, schematically shown at 84. Reclosing device 84 responds by driving a suitable plunger 85 upwardly to reengage the contacts 16, 14 of breaker 12. When the contacts 16, 14 of the circuit breaker reengage, control contacts 70 are opened, thereby discontinuing operation of oscillator 67. Reengagement of the main contacts 16, 14 establishes a low resistance path across the triggered vacuum gap device 60 which prevents continued passage of current therethrough, restoring triggered vacuum gap 60 to its normally nonconductive condition.

The reclosing device 84, being a mechanical device, requires a relatively long time to produce contact reengagement, for example, at least five electrical cycles from the time it receives a reclosure-initiating impulse. If there had been no shunting device such as 60 carrying current across the open contacts of the breaker 12 during this relatively long period, then the power circuit 10 would have been out of service for this period. But by providing the shunting gap 60 I am able to maintain the power circuit 10 energized and conductive during this entire period, eliminating any undesired loss of service.

Graphical representation of operating events

Figure 2:
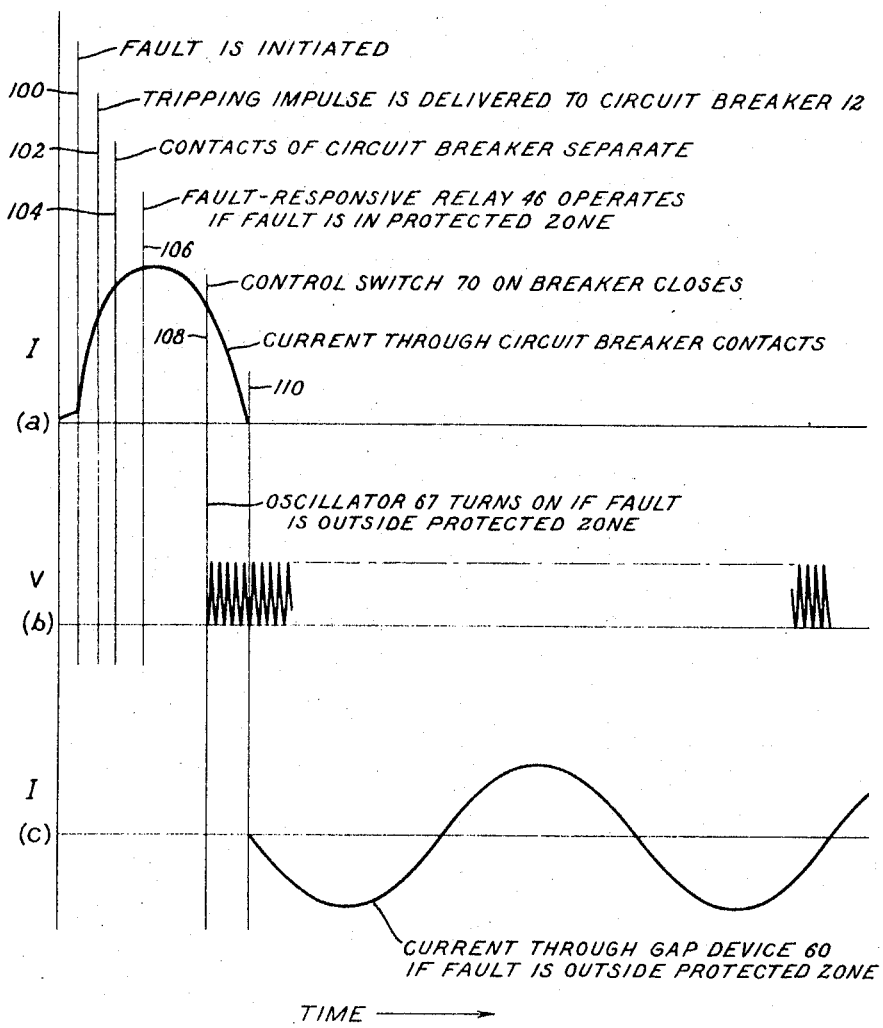
FIG. 2 is a graphic representation of certain current-time and voltage-time relationships present in the circuit protective means of FIG. 1.

The above-described operating sequence (in the unmodified form) is graphically depicted in FIG. 2. Graph (a) depicts the current through the circuit breaker contacts. The fault is initiated at instant 100; the traveling wave-responsive tripping means 26, 27, 30, 32 delivers a tripping impulse to tripping solenoid 22 at instant 102; and the contacts begin separating at instant 104. Assuming the fault is within the protected zone 10a, fault responsive relay 46 picks up at instant 106. Control switch 70 on circuit breaker 12 closes at instant 108, and the first current zero occurs at instant 110. If the fault-responsive relay had opened in response to a fault in the protected zone, then oscillator 67 is not turned on, no resultant triggering of gap device 60 would occur, and interruption would be completed at current zero 110.

If the fault had been outside the protected zone, relay 46 would have remained inactive, and oscillator 67 would have been turned on at instant 108, as indicated by the repetitive voltage pulse shown in graph (b). This would cause current to flow through gap device 60 immediately following the first current zero at 110. Current would continue flowing through the gap device 60 until the circuit breaker 12 reclosed. Such current is indicated in graph (c).

Figure 3:
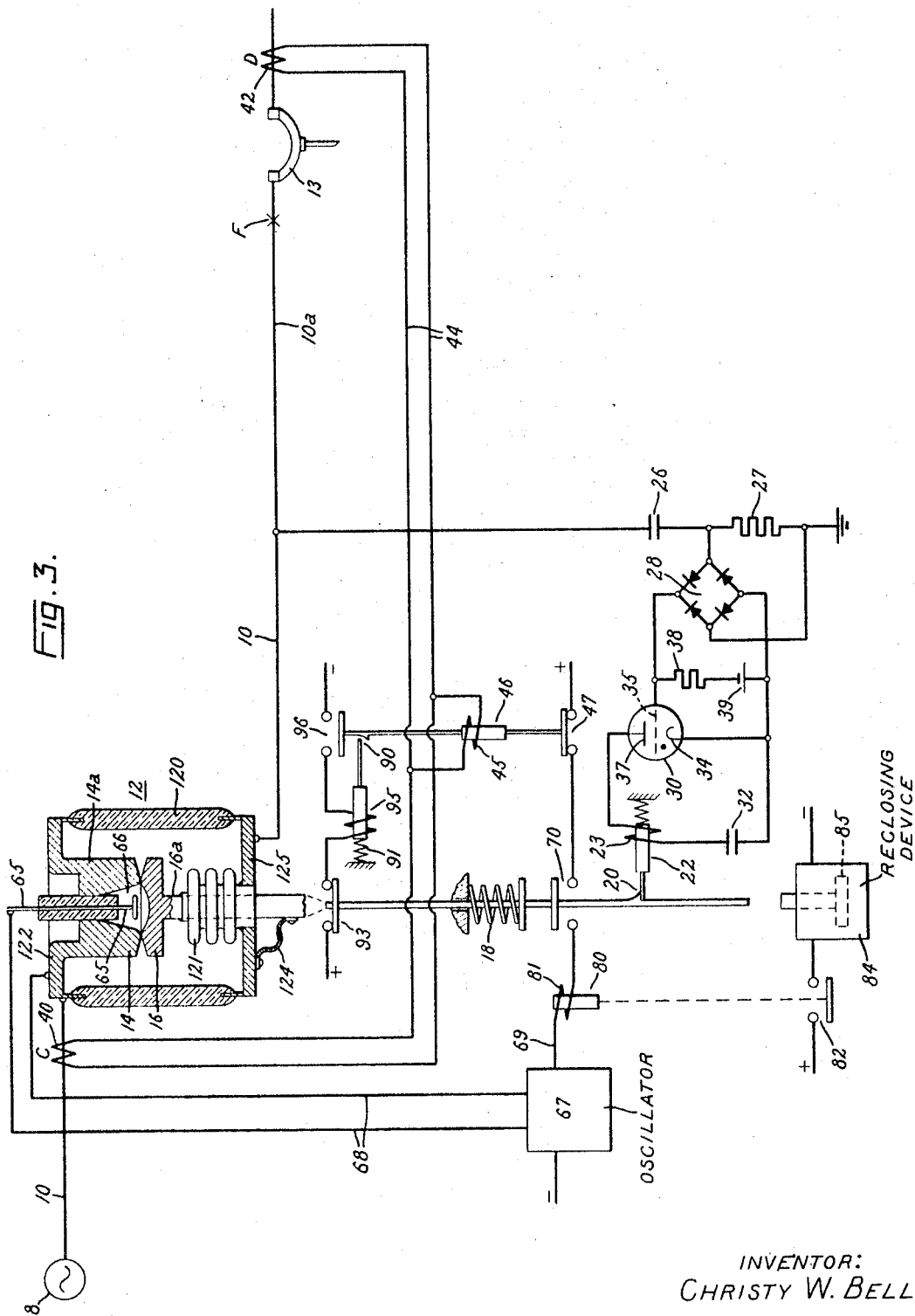
FIG. 3 illustrates a modified embodiment of the circuit protective means.

Embodiment of FIG. 3

FIG. 3 illustrates another embodiment of the invention. Here the circuit breaker 12 is a circuit breaker of the triggered vacuum type, such as shown and claimed in the aforesaid Lafferty Patent 3,303,376 (FIG. 3) or in Patent 3,319,121, Lee, assigned to the assignee of the present invention. As such, it comprises a highly evacuated envelope 120 of insulating material having metal end caps 122 and 125. Inside the envelope are mounted a stationary contact 14 and a movable contact 16. The stationary contact 14 is fixed to a conductive rod 14a integral upper end cap 122. Movable contact 16 is fixed to a vertically-movable rod 16a that extends through the lower end cap 125. A flexible metal bellows 121 is connected between rod 16a and the lower end cap 125 to provide a suitable seal therebetween that permits vertical movement of the rod without impairing the vacuum inside the envelope. Power current flows through the vacuum circuit breaker 12 when it is closed via its upper end cap 122, rod 14a, contacts 14 and 16, rod 16a, a flexible conductor 124, and lower end cap 125. Opening of the circuit breaker is effected by tripping latch 20 to permit opening spring 18 to drive contact 16 downwardly and establish a main gap between contacts 14 and 16.

A recess is provided in contact 14 into which trigger electrode 65 extends. A schematically-shown trigger gap 66 corresponding to the trigger gap 66 of FIG. 1 is provided between trigger electrode 65 and contact 14. When the trigger gap 66 is sparked-over, ionized particles are produced which are rapidly projected into the main gap between contacts 14 and 16 to produce an arc-over thereof.

In this embodiment of FIG. 3, if the fault is outside the protected zone 10a, the gap between the then-separated contacts 14, 16 (instead of a separated gap) is triggered into conduction to maintain service over power circuit 10. Otherwise, the apparatus of FIG. 3 is substantially the same as that of FIG. 1, and identical reference numerals are used to designate corresponding parts. If a fault outside the protected zone 10a causes the circuit breaker 12 to open, the control contacts 70 close and turn on the oscillator 67. Oscillator 67 immediately supplies voltage pulses to trigger gap 66, assuring that the main vacuum gap between the then-separated contacts 14 and 16 will be rendered conductive to permit current to continue through circuit breaker 12. Assuming that triggering is continued for a predetermined minimum duration, several cycles later, the reclosing device 84 causes the contacts 16, 14 to reengage, thereby reestablishing a solid metallic circuit through breaker 12. The arc that is developed between the separated main contacts by the aforesaid sparkover of the trigger gap 66 is considered to effectively shunt the gap between the main contacts 16, 14.

If the fault which initiated opening of the circuit breaker is located outside the protected zone 10a, e.g., at F, then the fault-responsive relay 46 will have opened before control contacts 70 close. Thus, for a fault at F, the oscillator 67 will remain turned off, and nothing will occur at the trigger gap 66 to effect the normal interrupting operation.

In a modification of FIG. 3, the operation of relay 46 is delayed until after control contacts 70 close. In this case, closing of the control contacts 70 will cause triggering by oscillator 67, but triggering will be terminated after a very brief interval by operation of relay 46 upon opening of its contacts 47 responsive to a fault in its protection zone. Thereafter, the vacuum gap between contacts 14 and 16 will clear at the first current zero following termination of triggering.

To prevent erroneous reclosing of the circuit breaker under these conditions, reclosing relay 80 is slightly time-delayed so that it has insufficient time to pick-up before contacts 47 of the protective relay open in response to a fault in the protection zone of relay 46.

If relay 46 remains inactive (because the fault is outside its protection zone), a triggering by oscillator 67 will continue after its initiation by contacts 70. A short time later, the reclosing device 84 will reengage the contacts 14, 16, in the same manner as described hereinabove.

While I have shown and described particular embodiments of the invention, it will be obvious to those skilled in the art that various changes and modifications may be made without departing from the invention in its broader aspects; and I, therefore, intend in the appended claims to cover all such changes and modifications as fall within the true spirit and scope of the invention.

What I claim as new and desire to secure by Letters Patent of the United States is:

1. Circuit protective means for a power circuit, comprising:
  (a) a high speed circuit breaker having a pair of relatively movable contacts that are normally engaged and arranged for connection in said power circuit,
  (b) opening means for separating said contacts at high speed in response to receipt of an opening signal, thereby establishing a gap between the contacts,
  (c) means responsive to a traveling wave on the power circuit for delivering an opening signal to said opening means,
  (d) a triggered gap device connected in parallel with said contacts,
  (e) relay means for determining whether said traveling wave represents a fault that requires continued opening of said circuit breaker to isolate said fault, (f) and means for triggering said gap device into conduction during the period immediately after establishment of said inter-contact gap if said relay means determines that continued opening of said circuit breaker is not required for fault isolation.

2. The apparatus of claim 1 in which said triggering means is energized within two electrical cycles following contact-parting if continued opening of said circuit breaker is not needed for fault isolation.

3. The apparatus of claim 1 in combination with means responsive to operations which result in said gap device being triggered into conduction for reengaging said circuit breaker contacts to divert current from a path through said gap device to a path through said contacts.

4. Circuit protective means for a power circuit, comprising:
(a) a high speed circuit breaker having a pair of relatively movable contacts that are normally engaged and arranged for connection in said power circuit,
(b) opening means for separating said contacts at high speed in response to receipt of an opening signal, thereby establishing a gap between the contacts,
(c) means responsive to a traveling wave on the power circuit for delivering an opening signal to said opening means,
(d) relay means for determining whether said traveling wave represents a fault that requires continued opening of the circuit breaker to isolate said fault,
(e) means including triggering means for establishing an arc that effectively shunts the gap between the contacts of said circuit breaker when said trigger means is operated,
(f) and means for operating said triggering means during the period immediately after establishment of said intercontact gap if said relay means determines that continued opening of said circuit breaker is not required for fault isolation.

5. The apparatus of claim 4 in which said triggering means is initially operated after said contacts are separated but before said relay means determines whether continued opening of said circuit breaker is required for fault isolation.

6. The apparatus of claim 5 in combination with means for terminating operation of said triggering means if said relay means determines that continued opening of said circuit breaker is required for fault isolation.

7. The circuit protective means of claim 4 in which the arc-establishing means of limitation (e) comprises a separate gap shunting the gap between said contacts.

8. The circuit protective means of claim 7 in which said separate gap is a triggered vacuum gap.

9. The apparatus of claim 4 in which operation of said triggering means initiates an arc between said circuit breaker contacts across said inter-contact gap.

10. The apparatus of claim 9 in which said intercontact gap is a vacuum gap.

11. The apparatus of claim 4 in which said triggering means comprises a trigger gap and means for sparking over said trigger gap to effect operation of said triggering means.

12. Circuit protective means for a power circuit comprising:
(a) a high speed circuit breaker having a pair of relatively movable contacts that are normally engaged and arranged for connection in said power circuit,
(b) opening means responsive to a fault on said power circuit for separating said contacts at high speed upon the occurrence of a fault, thereby establishing a gap between the contacts for interrupting fault current,
(c) reclosing means for quickly reengaging said contacts if continued opening of said circuit breaker is not required for fault isolation,
(d) circuit-restoring means including triggering means for establishing an arc that effectively shunts the intercontact gap when said triggering means is operated,
(e) and means for operating said triggering means during the interval between establishment of said inter-contact gap and reengagement of said contacts if continued opening of said circuit breaker is not required for fault isolation.

13. The circuit protective means of claim 12, in which said triggering means is operated within a few electrical cycles after said contacts are separated, thereby limiting to a few electrical cycles or less any interruption in service caused by opening of said circuit breaker when unnecessary for fault isolation.

14. The circuit protective means of claim 12 which further comprises protective relay means operable upon determining that the fault is one which calls for opening of said circuit breaker, said opening means acting to initiate circuit-breaker opening prior to operation of said relay means, and means disabling the operating means for said triggering means if said protective relay means operates.

References Cited
UNITED STATES PATENTS

| | | | |
|---|---|---|---|
| 1,790,485 | 1/1931 | Raney | 317—23 |
| 2,014,949 | 9/1935 | Neher | 317—23 |
| 3,378,727 | 4/1968 | Kesselring | 317—22 |

JOHN F. COUCH, Primary Examiner

D. J. HARNISH, Assistant Examiner

U.S. Cl. X.R.

317—29

PO-1050
(5/69)

UNITED STATES PATENT OFFICE
CERTIFICATE OF CORRECTION

Patent No. 3,462,646                Dated August 19, 1969

Inventor(s) Christy W. Bell

It is certified that error appears in the above-identified patent and that said Letters Patent are hereby corrected as shown below:

Column 8, line 25, change "outside" to "inside"

SIGNED AND
SEALED
NOV 17 1970

(SEAL)
Attest:

Edward M. Fletcher, Jr.
Attesting Officer

WILLIAM E. SCHUYLER, JR.
Commissioner of Patents